(12) United States Patent
Ito et al.

(10) Patent No.: US 12,368,517 B2
(45) Date of Patent: Jul. 22, 2025

(54) OPTICAL POWER SUPPLY SYSTEM, POWER RECEIVING SIDE OPTICAL COMMUNICATION DEVICE AND POWER SUPPLY METHOD

(71) Applicant: Nippon Telegraph and Telephone Corporation, Tokyo (JP)

(72) Inventors: Kenta Ito, Musashino (JP); Hiroaki Katsurai, Musashino (JP); Tomoaki Yoshida, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 282 days.

(21) Appl. No.: 18/036,015

(22) PCT Filed: Nov. 20, 2020

(86) PCT No.: PCT/JP2020/043481
§ 371 (c)(1),
(2) Date: May 9, 2023

(87) PCT Pub. No.: WO2022/107333
PCT Pub. Date: May 27, 2022

(65) Prior Publication Data
US 2024/0022336 A1 Jan. 18, 2024

(51) Int. Cl.
*H04B 10/80* (2013.01)
*H04B 10/43* (2013.01)
(Continued)

(52) U.S. Cl.
CPC .......... *H04B 10/807* (2013.01); *H04B 10/43* (2013.01); *H04B 10/69* (2013.01); *H04B 10/50* (2013.01)

(58) Field of Classification Search
None
See application file for complete search history.

(56) References Cited

U.S. PATENT DOCUMENTS 5,796,890 A * 8/1998 Tsuji ...................... G08C 23/06
398/1
6,362,906 B1 * 3/2002 O'Shea ................ H01Q 21/061
342/368

(Continued)

FOREIGN PATENT DOCUMENTS

JP 2017098643 6/2017

*Primary Examiner* — Darren E Wolf
(74) *Attorney, Agent, or Firm* — Fish & Richardson P.C.

(57) ABSTRACT

A power supply side optical communication apparatus supplies power to a power receiving side optical communication apparatus using an optical signal. A power storage unit stores the supplied power. A data control unit superimposes data control information related to transmission/reception of data transmitted/received by a data transmission/reception unit on the optical signal for power supply. A control information detection unit detects the data control information superimposed on the optical signal for power supply. A power supply control unit detects presence of transmission and reception of the data in an optical transmission/reception unit and an external transmission/reception unit on the basis of the data control information and data stored in a data storage unit, and supplies the power to the optical transmission/reception unit or the external transmission/reception unit according to the detected presence or absence of transmission and reception of the data.

8 Claims, 5 Drawing Sheets

(51) Int. Cl.
*H04B 10/50* (2013.01)
*H04B 10/69* (2013.01)

(56) References Cited

U.S. PATENT DOCUMENTS

| | | | |
|---|---|---|---|
| 7,072,475 B1 * | 7/2006 | DeNap | H04B 1/385 |
| | | | 381/74 |
| 2008/0235418 A1 * | 9/2008 | Werthen | H04B 10/807 |
| | | | 710/106 |
| 2009/0162076 A1 * | 6/2009 | Wang | G01N 17/02 |
| | | | 398/185 |
| 2017/0346347 A1 * | 11/2017 | Abiri | H02J 50/30 |
| 2023/0120640 A1 * | 4/2023 | Silvestri | H04B 10/807 |
| | | | 250/227.14 |

* cited by examiner

OPTICAL POWER SUPPLY SYSTEM, POWER RECEIVING SIDE OPTICAL COMMUNICATION DEVICE AND POWER SUPPLY METHOD

CROSS-REFERENCE TO RELATED APPLICATIONS

This application is a National Stage application under 35 U.S.C. § 371 of International Application No. PCT/JP2020/043481, having an International Filing Date of Nov. 20, 2020. The disclosure of the prior application is considered part of the disclosure of this application, and is incorporated by reference in its entirety into this application.

TECHNICAL FIELD

The present invention relates to an optical power supply system, a power receiving side optical communication apparatus, and a power supply method.

BACKGROUND ART

As an optical power supply system in the related art, a configuration illustrated in FIG. 5 has been proposed (see, for example, Patent Literature 1). FIG. 5 is a diagram for describing an optical power supply system in the related art. In FIG. 5, FIG. 2 of Patent Literature 1 is cited. The optical power supply system illustrated in FIG. 5 includes a master unit 120 and three slave units 127-1, 127-2, and 127-3. The master unit 120 and the slave units 127-1 to 127-3 are connected in a star shape via an optical fiber 125 and an optical splitter 126. The master unit 120 includes a power supply laser light source 121 that emits light having a wavelength $\lambda p$, a downlink communication optical transmitter 122 that emits light having a wavelength Ad, and an uplink communication optical receiver 123 that receives light having a wavelength $\lambda u$. The light having the wavelengths $\lambda p$, $\lambda d$, and $\lambda u$ is multiplexed and demultiplexed by a wavelength multiplexer/demultiplexer 124.

Each of the slave units 127-1 to 127-3 includes power supply optical receivers 129-1 to 129-3 that receive light having a wavelength $\lambda p$, downlink communication optical receivers 130-1 to 130-3 that receive light having a wavelength $\lambda d$, and uplink communication optical transmitters 131-1 to 131-3 that emit light having a wavelength $\lambda u$. The light having the wavelengths $\lambda p$, $\lambda d$, and $\lambda u$ is multiplexed and demultiplexed by wavelength multiplexer/demultiplexers 128-1 to 128-3.

A downlink communication signal 132 having a wavelength $\lambda d$ transmitted by the master unit 120 is configured by repetition of a time frame 134 having a constant time width. Each time frame includes slave unit identification information 133. An uplink communication signal 135 having a wavelength $\lambda u$ is a signal obtained by combining the communication signals of the light having the wavelength $\lambda u$ emitted from each of the uplink communication optical transmitters 131-1 to 131-3 by the optical splitter 126. The time width of the uplink communication signal 135 is a time width corresponding to the communication amount of each of the slave units 127-1 to 127-3.

In the optical power supply system of Patent Literature 1, since the power supply optical receivers 129-1 to 129-3 included in the slave units 127-1 to 127-3 receive the power supply light output from the power supply laser light source 121 included in the master unit 120, the slave units 127-1 to 127-3 can receive power supply from the master unit 120.

The downlink communication signal 132 having the wavelength $\lambda d$ transmitted by the master unit 120 is configured by repetition of the time frame 134 having a constant time width, and each time frame 134 is allocated to each of the slave units 127-1 to 127-3. Therefore, each of the slave units 127-1 to 127-3 is in the operating state only for the time of receiving the time frame 134 including the slave unit identification information 133 corresponding to the slave unit itself, and transitions to the non-operating state for the other times. Thereby, it is possible to make it unnecessary for the slave units 127-1 to 127-3 to wait for the downlink communication, and thus it is possible to reduce the power consumption in the slave units 127-1 to 127-3.

CITATION LIST

Patent Literature

Patent Literature 1: JP 2017-98643 A

SUMMARY OF INVENTION

Technical Problem

However, in the optical power supply system in Patent Literature 1, since the slave units 127-1 to 127-3 necessarily need to be activated at a constant cycle, that is, at intervals of time frames 134×N having a constant time width, power is consumed at a constant cycle regardless of the presence or absence of data transmitted and received (here, N is the number of slave units 127-1 to 127-3). Therefore, when the amount of power storage in the slave units 127-1 to 127-3 is less than the amount of power necessary for activation and data processing, there is a problem that each of the slave units 127-1 to 127-3 cannot process the downlink communication signal 132 received from the master unit 120 and the uplink communication signal 135 transmitted to the master unit 120 and may discard them due to power shortage.

In view of the above circumstances, an object of the present invention is to provide a technology capable of preventing power from being consumed by unnecessary activation or operation when there is no data to be transmitted and received in an optical communication system that supplies power by light.

Solution to Problem

According to one aspect of the present invention, there is provided an optical power supply system including: a power supply side optical communication apparatus; and a power receiving side optical communication apparatus, in which the power supply side optical communication apparatus includes: an optical power supply unit configured to transmit an optical signal for power supply; a data transmission/reception unit configured to transmit and receive an optical signal of data; and a data control unit configured to superimpose data transmission/reception control information related to transmission/reception of data transmitted/received by the data transmission/reception unit on the optical signal for power supply, and the power receiving side optical communication apparatus includes: a power storage unit configured to store power obtained from the optical signal for power supply transmitted by the optical power supply unit; a control information detection unit configured to detect the data transmission/reception control information superimposed on the optical signal for power supply; an optical transmission/reception unit configured to transmit and receive the optical signal of the data to and from the data transmission/reception unit; an external transmission/reception unit configured to transmit and receive the data to and from an external apparatus; a data storage unit configured to store data that has not been transmitted to the power supply side optical communication apparatus or the external apparatus; and a power supply control unit configured to detect presence or absence of transmission and reception of the data in the optical transmission/reception unit and the external transmission/reception unit on the basis of the data transmission/reception control information detected by the control information detection unit and the data stored in the data storage unit, and supply the power stored in the power storage unit to the optical transmission/reception unit or the external transmission/reception unit according to the detected presence or absence of transmission and reception of the data.

According to one aspect of the present invention, there is provided a power receiving side optical communication apparatus that is connected to a power supply side optical communication apparatus including an optical power supply unit configured to transmit an optical signal for power supply, a data transmission/reception unit configured to transmit and receive an optical signal of data, and a data control unit configured to superimpose data transmission/reception control information related to transmission/reception of data transmitted/received by the data transmission/reception unit on the optical signal for power supply, the power receiving side optical communication apparatus including: a power storage unit configured to store power obtained from the optical signal for power supply; a control information detection unit configured to detect the data transmission/reception control information superimposed on the optical signal for power supply; an optical transmission/reception unit configured to transmit and receive the optical signal of the data to and from the data transmission/reception unit; an external transmission/reception unit configured to transmit and receive the data to and from an external apparatus; a data storage unit configured to store data that has not been transmitted to the power supply side optical communication apparatus or the external apparatus; and a power supply control unit configured to detect presence or absence of transmission and reception of the data in the optical transmission/reception unit and the external transmission/reception unit on the basis of the data transmission/reception control information detected by the control information detection unit and the data stored in the data storage unit, and supply the power stored in the power storage unit to the optical transmission/reception unit or the external transmission/reception unit according to the detected presence or absence of transmission and reception of the data.

According to one aspect of the present invention, there is provided a power supply method performed in an optical power supply system including a power supply side optical communication apparatus and a power receiving side optical communication apparatus, the power supply method including: supplying, by the power supply side optical communication apparatus, power to the power receiving side optical communication apparatus using an optical signal for power supply; storing, by a power storage unit of the power receiving side optical communication apparatus, the supplied power; transmitting and receiving, by a data transmission/reception unit of the power supply side optical communication apparatus and an optical transmission/reception unit of the power receiving side optical communication apparatus, optical signals of data; transmitting and receiving, by an external transmission/reception unit of the power receiving side optical communication apparatus and an external apparatus, the data; recording, in a data storage unit of the power receiving side optical communication apparatus, data that has not been transmitted to the power supply side optical communication apparatus or the external apparatus; superimposing, by a data control unit of the power supply side optical communication apparatus, data transmission/reception control information related to transmission/reception of data transmitted/received by the data transmission/reception unit on the optical signal for power supply; detecting, by a control information detection unit of the power receiving side optical communication apparatus, the data transmission/reception control information superimposed on the optical signal for power supply; and detecting, by a power supply control unit of the power receiving side optical communication apparatus, presence or absence of transmission and reception of the data in the optical transmission/reception unit and the external transmission/reception unit on the basis of the data transmission/reception control information detected by the control information detection unit and the data stored in the data storage unit, and supplying the power stored in the power storage unit to the optical transmission/reception unit or the external transmission/reception unit according to the detected presence or absence of transmission and reception of the data.

Advantageous Effects of Invention

According to the present invention, in an optical communication system that supplies power by light, it is possible to prevent power from being consumed by unnecessary activation or operation when there is no data to be transmitted and received.

DESCRIPTION OF EMBODIMENTS

First Embodiment

Figure 1:
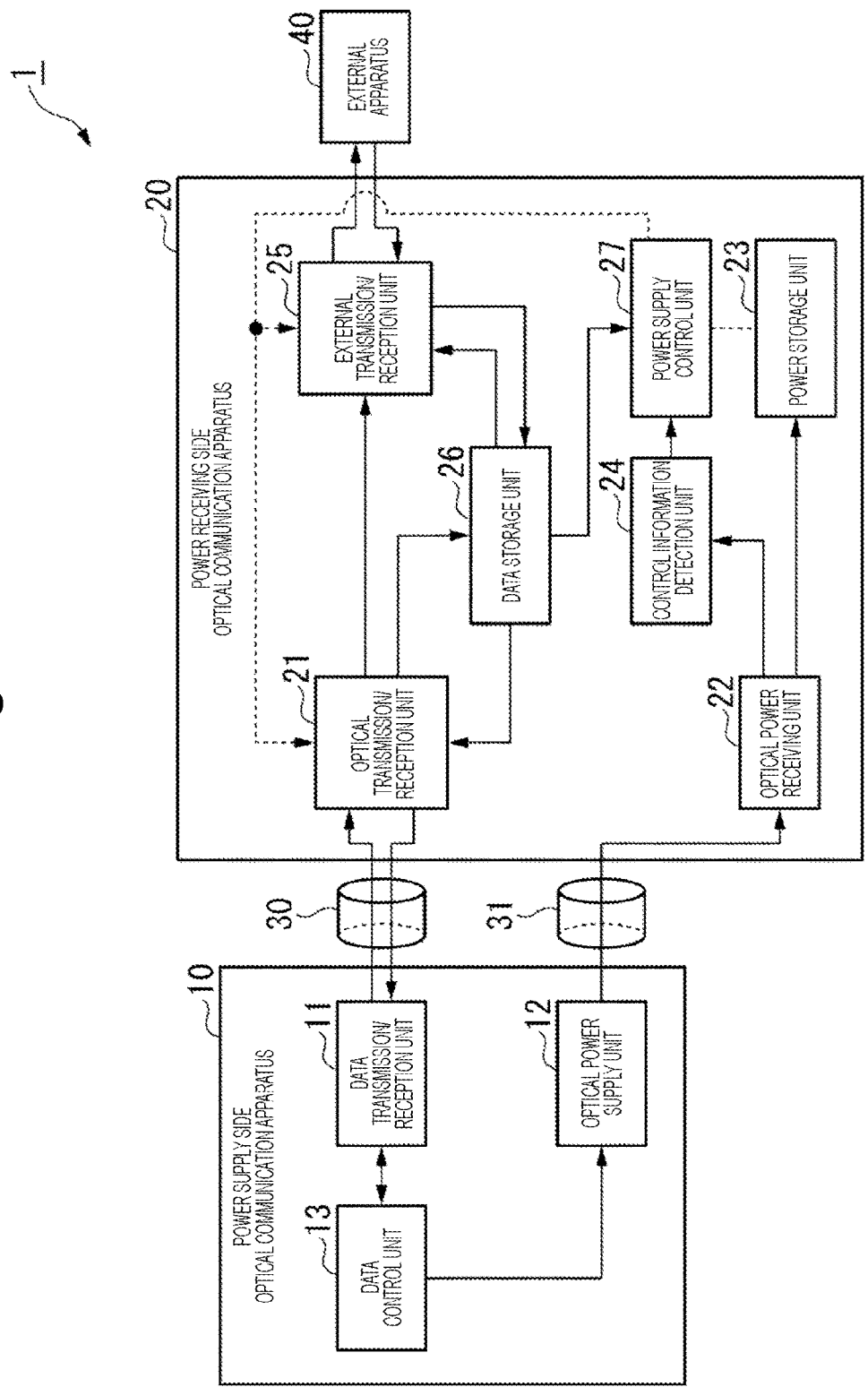
FIG. 1 is a block diagram illustrating a configuration of an optical power supply system according to a first embodiment.

Hereinafter, embodiments of the present invention will be described with reference to the drawings. FIG. 1 is a block diagram illustrating a configuration of an optical power supply system 1 according to a first embodiment. The optical power supply system 1 includes a power supply side optical communication apparatus 10, a power receiving side optical communication apparatus 20, an external apparatus 40, and two optical fibers 30 and 31 that connect the power supply side optical communication apparatus 10 and the power receiving side optical communication apparatus 20 to each other.

The power supply side optical communication apparatus 10 is, for example, an optical line terminal (OLT). The power supply side optical communication apparatus 10 includes a data transmission/reception unit 11, an optical power supply unit 12, and a data control unit 13. The data transmission/reception unit 11 is, for example, an optical transceiver, and includes a light source that emits light for data transmission inside. The data transmission/reception unit 11 modulates light emitted from a light source provided inside on the basis of an electrical signal of data given from the data control unit 13 to convert the light into an optical signal of data, and sends the converted optical signal of data to the optical fiber 30. The data transmission/reception unit 11 includes, for example, an optical/electrical (O/E) converter such as a photodetector inside. The data transmission/reception unit 11 receives an optical signal of data received through the optical fiber 30, converts the received optical signal of the data into an electrical signal by the O/E converter, and outputs the converted electrical signal to the data control unit 13.

The data control unit 13 takes in data to be transmitted to the power receiving side optical communication apparatus 20 from the outside. The data control unit 13 generates data of the electrical signal from the taken data, and outputs the generated data of the electrical signal to the data transmission/reception unit 11 according to an arbitrarily determined transmission timing. The data control unit 13 takes in data of the electrical signal output from the data transmission/reception unit 11 according to an arbitrarily determined reception timing, and outputs the taken data to the outside. The data control unit 13 generates data transmission/reception control information including a scheduled transmission data amount indicating the amount of data scheduled to be transmitted, a receivable data amount indicating the amount of data that can be received, and transmission/reception timing information indicating a timing of transmission/reception of data at an arbitrarily determined timing, and outputs the generated data transmission/reception control information to the optical power supply unit 12.

Here, the scheduled transmission data amount and the receivable data amount are "0" or positive numerical values. When the scheduled transmission data amount is "0", it means that there is no data to be transmitted by the power supply side optical communication apparatus 10, and when the scheduled transmission data amount is a value other than "0", it means that the power supply side optical communication apparatus 10 is scheduled to transmit data of the data amount of the value. When the receivable data amount is "0", it means that the power supply side optical communication apparatus 10 does not receive data, and when the receivable data amount is a value other than "0", it means that the power supply side optical communication apparatus 10 can receive data of the data amount of the value.

The optical power supply unit 12 includes a light source that emits light for power supply inside, and generates an optical signal for power supply by the light source and sends the optical signal to the optical fiber 31. After taking in the data transmission/reception control information output from the data control unit 13, the optical power supply unit 12 superimposes the data transmission/reception control information on an optical signal for power supply and sends the superimposed optical signal to the optical fiber 31.

The external apparatus 40 is, for example, a sensor node such as an Internet of Things (IoT) sensor. The external apparatus 40 is connected to the power receiving side optical communication apparatus 20 by wireless or wired communication means. For example, the external apparatus 40 transmits data measured by a sensor provided inside to the power receiving side optical communication apparatus 20 at a predetermined constant cycle. The external apparatus 40 receives data transmitted by the power receiving side optical communication apparatus 20. Note that there may be a plurality of external apparatuses 40, and in this case, the plurality of external apparatuses 40 are connected to the power receiving side optical communication apparatus 20 by wireless or wired communication means.

The power receiving side optical communication apparatus 20 is, for example, an optical network unit (ONU). The power receiving side optical communication apparatus 20 includes an optical transmission/reception unit 21, an optical power receiving unit 22, a power storage unit 23, a control information detection unit 24, an external transmission/reception unit 25, a data storage unit 26, and a power supply control unit 27.

The optical transmission/reception unit 21 is, for example, an optical transceiver, and includes a light source that emits light for data transmission inside. The optical transmission/reception unit 21 modulates light emitted from a light source provided inside on the basis of an electrical signal of data read from the data storage unit 26 to convert the light into an optical signal of data, and sends the converted optical signal of the data to the optical fiber 30. The optical transmission/reception unit 21 includes, for example, an O/E converter such as a photodetector inside, receives an optical signal of data received through the optical fiber 30, converts the received optical signal of the data into an electrical signal by the O/E converter, and outputs the converted electrical signal to the external transmission/reception unit 25.

The optical power receiving unit 22 is, for example, an O/E converter, receives an optical signal for power supply received through the optical fiber 31, and converts the received optical signal for power supply into an electrical signal. The optical power receiving unit 22 outputs the converted electrical signal to the power storage unit 23.

The power storage unit 23 is, for example, a battery, performs charging processing on the basis of the electrical signal output from the optical power receiving unit 22, and stores power of the electrical signal. The power storage unit 23 supplies power necessary for operation to the optical power receiving unit 22, the control information detection unit 24, the data storage unit 26, and the power supply control unit 27. The control information detection unit 24 detects data transmission/reception control information superimposed on the electrical signal for power supply converted by the optical power receiving unit 22.

The external transmission/reception unit 25 is connected to the external apparatus 40 by wireless or wired communication means. When the external transmission/reception unit 25 is connected to the external apparatus 40 by wireless communication means, for example, a Wi-Fi module (Wi-Fi is a registered trademark) or the like is applied as the external transmission/reception unit 25. The external transmission/reception unit 25 receives data transmitted by the external apparatus 40 at a predetermined constant cycle, and writes and stores the received data in the data storage unit 26. The external transmission/reception unit 25 takes in data output from the optical transmission/reception unit 21, and transmits the taken data to the external apparatus 40. When the data storage unit 26 stores data to be transmitted to the external apparatus 40, the external transmission/reception unit 25 reads the data from the data storage unit 26 and transmits the read data to the external apparatus 40.

The data storage unit 26 stores the data received by the external transmission/reception unit 25 from the external apparatus 40 as uplink data. The data storage unit 26 stores, as downlink data, data that the optical transmission/reception unit 21 has not output to the external transmission/reception unit 25. Here, the uplink data is data that the power receiving side optical communication apparatus 20 receives from the external apparatus 40 and transmits to the power supply side optical communication apparatus 10, and the downlink data is data that the power receiving side optical communication apparatus 20 receives from the power supply side optical communication apparatus 10 and transmits to the external apparatus 40. Note that the uplink data includes data that the power receiving side optical communication apparatus 20 receives from the external apparatus 40 and does not transmit to the power supply side optical communication apparatus 10, and the downlink data includes data that the power receiving side optical communication apparatus 20 receives from the power supply side optical communication apparatus 10 and does not transmit to the external apparatus 40. These pieces of data that are not transmitted are used for control processing in the power receiving side optical communication apparatus 20 and the like, and are erased from the data storage unit 26.

The power supply control unit 27 detects the presence or absence of data transmitted and received by the optical transmission/reception unit 21, and when there is data to be transmitted and received, the power supply control unit 27 supplies the power stored in the power storage unit 23 to the optical transmission/reception unit 21 at a timing of transmitting and receiving the data. The power supply control unit 27 detects the presence or absence of data transmitted by the external transmission/reception unit 25, and when there is data to be transmitted, the power supply control unit 27 supplies the power stored in the power storage unit 23 to the external transmission/reception unit 25 at a timing of transmitting the data. The power supply control unit 27 stores in advance information indicating a timing of a constant cycle at which the external transmission/reception unit 25 receives data from the external apparatus 40 in an internal storage area, and supplies the power stored in the power storage unit 23 at the constant cycle to the external transmission/reception unit 25.

In the optical power supply system 1, one optical fiber 30 transmits a downlink optical signal transmitted by the power supply side optical communication apparatus 10 and received by the power receiving side optical communication apparatus 20 and an uplink optical signal transmitted by the power receiving side optical communication apparatus 20 and received by the power supply side optical communication apparatus 10. Therefore, in the optical fiber 30, the light source included in the data transmission/reception unit 11 and the light source included in the optical transmission/reception unit 21 emit light having different wavelengths so that the downlink optical signal and the uplink optical signal do not interfere with each other. The data transmission/reception unit 11 and the optical transmission/reception unit 21 internally include an optical multiplexer/demultiplexer that multiplexes and demultiplexes these different wavelengths.

A state in which, for example, connection cannot be established due to an unsatisfactory wireless environment, and the external transmission/reception unit 25 cannot transmit data to the external apparatus 40 in the case of a configuration in which the external transmission/reception unit 25 and the external apparatus 40 are connected by wireless communication means, or a state in which, for example, in order to reduce the processing load of the external apparatus 40, processing for transmitting data by the external apparatus 40 is prioritized over processing for receiving data by the external apparatus 40, and processing for transmitting data to the external apparatus 40 is suspended while the external transmission/reception unit 25 receives data from the external apparatus 40 is also assumed. In such a state, the optical transmission/reception unit 21 does not output data to the external transmission/reception unit 25, and writes and stores the data in the data storage unit 26 as downlink data.

In the detection of the state in which the external transmission/reception unit 25 cannot transmit data to the external apparatus 40, for example, the external transmission/reception unit 25 has a flag indicating a connection state with the external apparatus 40 in an internal storage area, and the flag is set to "1" when the data can be transmitted to the external apparatus 40, and the flag is set to "0" when the data cannot be transmitted to the external apparatus 40. Before outputting data to the external transmission/reception unit 25, the optical transmission/reception unit 21 refers to the flag and determines whether to output the data to the external transmission/reception unit 25 or to write and store the data in the data storage unit 26 without outputting the data to the external transmission/reception unit 25.

Power Supply Processing in Optical Power Supply System of First Embodiment

Figure 2:
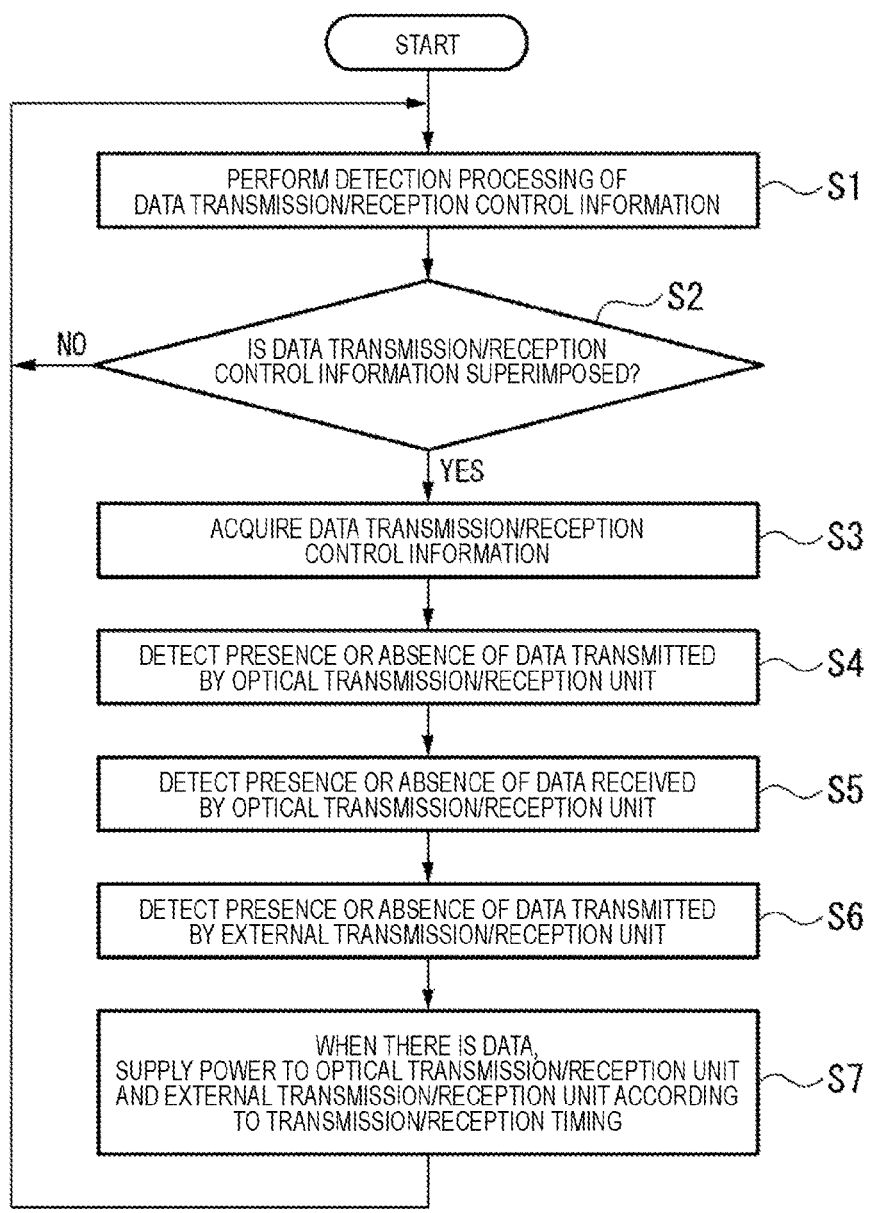
FIG. 2 is a flowchart illustrating a flow of processing by a power receiving side optical communication apparatus according to the first embodiment.

FIG. 2 is a flowchart illustrating the operation of the power receiving side optical communication apparatus 20, and power supply processing in the optical power supply system 1 will be described with reference to the flowchart.

In parallel with the processing of the flowchart of FIG. 2, in the optical power supply system 1, the following processing is repeatedly and continuously performed. The optical power supply unit 12 of the power supply side optical communication apparatus 10 generates an optical signal for power supply, and transmits the generated optical signal for power supply to the power receiving side optical communication apparatus 20 through the optical fiber 31. The data control unit 13 generates data transmission/reception control information at an arbitrarily determined timing, and outputs the generated data transmission/reception control information to the optical power supply unit 12. Upon receiving the data transmission/reception control information from the data control unit 13, the optical power supply unit 12 superimposes the received data transmission/reception control information on an optical signal for power supply and transmits the superimposed optical signal.

Upon receiving the optical signal for power supply through the optical fiber 31, the optical power receiving unit 22 of the power receiving side optical communication apparatus 20 converts the received optical signal for power supply into an electrical signal and outputs the converted electrical signal to the power storage unit 23. The power storage unit 23 performs charging processing on the basis of the electrical signal output from the optical power receiving unit 22, and stores power of the electrical signal.

The external apparatus 40 transmits data measured by a sensor provided inside to the power receiving side optical communication apparatus 20 at a predetermined constant cycle. Therefore, the power supply control unit 27 of the power receiving side optical communication apparatus 20 supplies the power stored in the power storage unit 23 to the external transmission/reception unit 25 at the constant cycle. Thereby, the external transmission/reception unit 25 of the power receiving side optical communication apparatus 20 can receive data transmitted by the external apparatus 40, and writes and stores the received data in the data storage unit 26 as uplink data.

Hereinafter, the flow of processing will be described with reference to the flowchart of FIG. 2. The control information detection unit 24 of the power receiving side optical communication apparatus 20 performs detection processing of the data transmission/reception control information on the electrical signal output from the optical power receiving unit 22 (step S1), and determines whether or not the data transmission/reception control information is superimposed on the electrical signal (step S2). When the control information detection unit 24 determines that the data transmission/reception control information is not superimposed on the electrical signal output from the optical power receiving unit 22 (step S2, No), the control information detection unit 24 performs the processing of step S1 again.

On the other hand, when the control information detection unit 24 determines that the data transmission/reception control information is superimposed on the electrical signal output from the optical power receiving unit 22 (step S2, Yes), the control information detection unit 24 reads the data transmission/reception control information superimposed on the electrical signal, and outputs the read data transmission/reception control information to the power supply control unit 27.

After taking in the data transmission/reception control information output from the control information detection unit 24, the power supply control unit 27 reads a scheduled transmission data amount, a receivable data amount, and transmission/reception timing information included in the taken data transmission/reception control information (step S3).

The power supply control unit 27 detects the presence or absence of data transmitted by the optical transmission/reception unit 21. Specifically, first, the power supply control unit 27 determines whether or not the data storage unit 26 stores uplink data. The power supply control unit 27 determines whether or not the receivable data amount is not "0" when there is uplink data in the data storage unit 26, and determines that there is data to be transmitted by the optical transmission/reception unit 21 when the receivable data amount is not "0". In a case where there is no uplink data in the data storage unit 26, or in a case where the receivable data amount is "0", which is a state in which the data transmission/reception unit 11 cannot receive data, even when there is uplink data in the data storage unit 26, the power supply control unit 27 determines that there is no data to be transmitted by the optical transmission/reception unit 21 (step S4).

The power supply control unit 27 detects the presence or absence of data received by the optical transmission/reception unit 21. Specifically, the power supply control unit 27 determines whether or not the scheduled transmission data amount is not "0", and determines that there is data to be received by the optical transmission/reception unit 21 when the scheduled transmission data amount is not "0". When the scheduled transmission data amount is "0", the power supply control unit 27 determines that there is no data to be received by the optical transmission/reception unit 21 (step S5).

The power supply control unit 27 detects the presence or absence of data transmitted by the external transmission/reception unit 25. Specifically, the power supply control unit 27 determines whether or not the data storage unit 26 stores downlink data or whether or not the scheduled transmission data amount is not "0", and determines that there is data to be transmitted by the external transmission/reception unit 25 when the data storage unit 26 stores downlink data or when the scheduled transmission data amount is not "0". When the data storage unit 26 does not store the downlink data and the scheduled transmission data amount is "0", the power supply control unit 27 determines that there is no data to be transmitted by the external transmission/reception unit 25 (step S6).

When it is detected that there is data to be transmitted by the optical transmission/reception unit 21, the power supply control unit 27 supplies the power stored in the power storage unit 23 to the optical transmission/reception unit 21 at a receivable timing of the power supply side optical communication apparatus 10 indicated by the transmission/reception timing information read from the data transmission/reception control information. When it is detected that there is data to be received by the optical transmission/reception unit 21, the power supply control unit 27 supplies the power stored in the power storage unit 23 to the optical transmission/reception unit 21 at a scheduled transmission timing of the power supply side optical communication apparatus 10 indicated by the transmission/reception timing information read from the data transmission/reception control information. When it is detected that there is data to be transmitted by the external transmission/reception unit 25, the power supply control unit 27 supplies the power stored in the power storage unit 23 to the external transmission/reception unit 25 at a scheduled transmission timing of the power supply side optical communication apparatus 10 indicated by the transmission/reception timing information read from the data transmission/reception control information (step S7). Note that, although the data storage unit 26 stores downlink data, when the scheduled transmission data amount is "0", the power supply control unit 27 may supply the power stored in the power storage unit 23 to the external transmission/reception unit 25 at an arbitrary timing.

Thereby, the optical transmission/reception unit 21 is activated at the receivable timing of the power supply side optical communication apparatus 10 indicated by the transmission/reception timing information, reads the uplink data stored in the data storage unit 26, and transmits the read data to the data transmission/reception unit 11.

The optical transmission/reception unit 21 and the external transmission/reception unit 25 are activated at the scheduled transmission timing of the power supply side optical communication apparatus 10 indicated by the transmission/reception timing information, and the optical transmission/reception unit 21 receives the data transmitted by the data transmission/reception unit 11 and outputs the received data to the external transmission/reception unit 25. The external transmission/reception unit 25 takes in data output from the optical transmission/reception unit 21, and transmits the taken data to the external apparatus 40. When the data storage unit 26 stores the downlink data, the external transmission/reception unit 25 reads the downlink data from the data storage unit 26 and transmits the read data to the external apparatus 40. When the external transmission/reception unit 25 cannot transmit data to the external apparatus 40, the optical transmission/reception unit 21 does not output the data to the external transmission/reception unit 25 but writes and stores the data in the data storage unit 26 as downlink data, and the external transmission/reception unit 25 does not read the downlink data from the data storage unit 26 but keeps the data stored.

In the configuration of the first embodiment described above, the power supply side optical communication apparatus 10 supplies power to the power receiving side optical communication apparatus 20 using an optical signal for power supply, and the power storage unit 23 stores the supplied power. The data transmission/reception unit 11 and the optical transmission/reception unit 21 transmit and receive optical signals of data. The external transmission/reception unit 25 and the external apparatus 40 transmit and receive data. The data storage unit 26 stores data that has not been transmitted to the power supply side optical communication apparatus 10 or the external apparatus 40. The data control unit 13 generates data transmission/reception control information related to transmission/reception of data transmitted/received by the data transmission/reception unit 11, and superimposes the generated data transmission/reception control information on an optical signal for power supply. The control information detection unit 24 detects data transmission/reception control information superimposed on the optical signal for power supply. The power supply control unit 27 detects the presence or absence of transmission and reception of data in the optical transmission/reception unit 21 and the external transmission/reception unit 25 on the basis of the data transmission/reception control information detected by the control information detection unit 24 and the data stored in the data storage unit 26, and supplies power stored in the power storage unit 23 to the optical transmission/reception unit 21 or the external transmission/reception unit 25 according to the detected presence or absence of transmission and reception of the data.

Thereby, the power supply control unit 27 supplies power to each of the optical transmission/reception unit 21 and the external transmission/reception unit 25 only when there is data to be transmitted and received. Therefore, power can be prevented from being consumed by unnecessary activation or operation when there is no data to be transmitted or received, and the power stored in the power storage unit 23 can be efficiently used.

In the processing of FIG. 2, the power supply control unit 27 may perform the processing by switching the order of the processing of step S4, step S5, and step S6 in an arbitrary order.

Second Embodiment

In the optical power supply system 1 of the first embodiment, the optical transmission/reception unit 21 has a configuration for transmitting data and a configuration for receiving data as a unit. The external transmission/reception unit 25 has a configuration for transmitting data and a configuration for receiving data as a unit. Therefore, for example, in the optical transmission/reception unit 21, even when there is data to be transmitted but there is no data to be received, or even when there is data to be received but there is no data to be transmitted, the power supply control unit 27 needs to supply power necessary for activation and operation to the optical transmission/reception unit 21. In the external transmission/reception unit 25, even when there is data to be transmitted but there is no data to be received, or even when there is data to be received but there is no data to be transmitted, the power supply control unit 27 needs to supply power necessary for activation and operation to the external transmission/reception unit 25.

Figure 3:
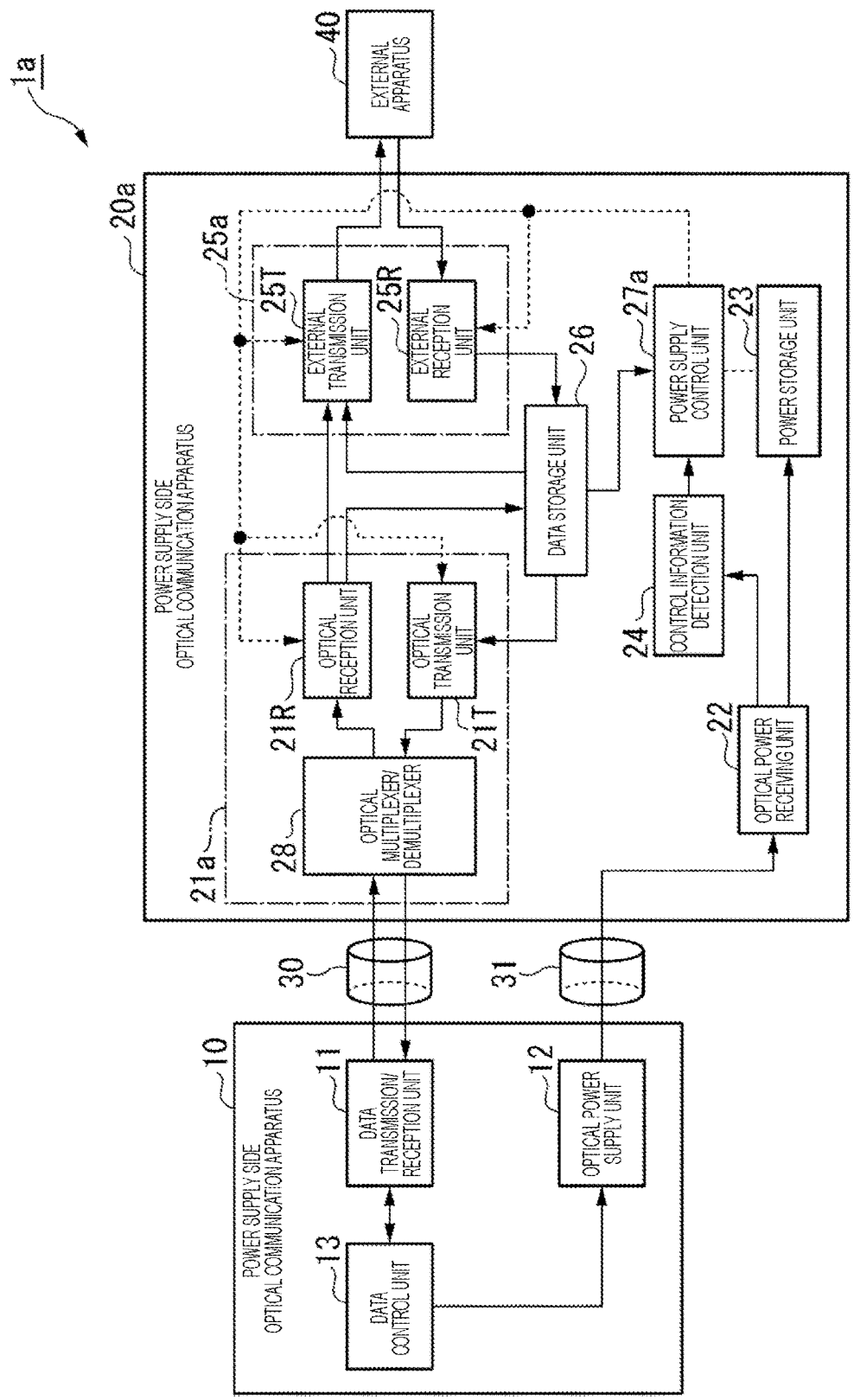
FIG. 3 is a block diagram illustrating a configuration of an optical power supply system according to a second embodiment.

In an optical power supply system 1a of a second embodiment, a configuration for transmitting data and a configuration for receiving data are separated in the optical transmission/reception unit 21 and the external transmission/reception unit 25, and more appropriate power is supplied according to transmission and reception timings. FIG. 3 is a block diagram illustrating a configuration of the optical power supply system 1a of the second embodiment. In the optical power supply system 1a, the same configurations as those of the optical power supply system 1 of the first embodiment are denoted by the same reference numerals, and different configurations will be described below.

The optical power supply system 1a includes a power supply side optical communication apparatus 10, a power receiving side optical communication apparatus 20a, an external apparatus 40, and two optical fibers 30 and 31 that connect the power supply side optical communication apparatus 10 and the power receiving side optical communication apparatus 20a to each other.

The power receiving side optical communication apparatus 20a is, for example, an ONU, and includes an optical transmission/reception unit 21a, an optical power receiving unit 22, a power storage unit 23, a control information detection unit 24, an external transmission/reception unit 25a, a data storage unit 26, and a power supply control unit 27a.

The optical transmission/reception unit 21a includes an optical transmission unit 21T, an optical reception unit 21R, and an optical multiplexer/demultiplexer 28. The optical transmission unit 21T corresponds to, for example, a configuration of a transmission portion of an optical transceiver, and includes a light source that emits light for data transmission inside. The optical transmission unit 21T modulates light emitted from a light source provided inside on the basis of an electrical signal of uplink data read from the data storage unit 26 to convert the light into an optical signal of data, and sends the converted optical signal of data to the optical fiber 30 via the optical multiplexer/demultiplexer 28. The optical reception unit 21R corresponds to, for example, a configuration of a reception portion of an optical transceiver, and includes an O/E converter such as a photodetector inside. The optical reception unit 21R receives an optical signal of data received through the optical fiber 30 and the optical multiplexer/demultiplexer 28, converts the received optical signal of data into an electrical signal by the O/E converter, and outputs the converted electrical signal to an external transmission unit 25T.

In the optical power supply system 1a, one optical fiber 30 transmits a downlink optical signal transmitted by the power supply side optical communication apparatus 10 and received by the power receiving side optical communication apparatus 20a and an uplink optical signal transmitted by the power receiving side optical communication apparatus 20a and received by the power supply side optical communication apparatus 10. Therefore, in the optical fiber 30, a light source included in a data transmission/reception unit 11 and the light source included in the optical transmission unit 21T emit light having different wavelengths so that the downlink optical signal and the uplink optical signal do not interfere with each other. The data transmission/reception unit 11 internally includes an optical multiplexer/demultiplexer that multiplexes and demultiplexes these different wavelengths. The optical transmission/reception unit 21a includes the optical multiplexer/demultiplexer 28 that multiplexes and demultiplexes these different wavelengths between the optical fiber 30 and the optical transmission unit 21T and the optical reception unit 21R.

The external transmission/reception unit 25a includes the external transmission unit 25T and an external reception unit 25R. The external transmission unit 25T and the external reception unit 25R are connected to the external apparatus 40 by wireless or wired communication means. When the external transmission unit 25T and the external reception unit 25R are connected to the external apparatus 40 by wireless communication means, for example, a transmission portion of a Wi-Fi module or the like is applied as the external transmission unit 25T, and a reception portion of a Wi-Fi module or the like is applied as the external reception unit 25R. The external transmission unit 25T takes in data output from the optical reception unit 21R, and transmits the taken data to the external apparatus 40. When the data storage unit 26 stores downlink data, the external transmission unit 25T reads the data from the data storage unit 26 and transmits the read data to the external apparatus 40. The external reception unit 25R receives data transmitted by the external apparatus 40 at a predetermined constant cycle, and writes and stores the received data in the data storage unit 26.

The power supply control unit 27a detects the presence or absence of data transmitted by the optical transmission unit 21T, and when there is data to be transmitted, the power supply control unit 27a supplies the power stored in the power storage unit 23 to the optical transmission unit 21T at a timing of transmitting the data. The power supply control unit 27a detects the presence or absence of data received by the optical reception unit 21R, and when there is data to be received, the power supply control unit 27a supplies the power stored in the power storage unit 23 to the optical reception unit 21R at a timing of receiving the data.

The power supply control unit 27a detects the presence or absence of data transmitted by the external transmission unit 25T, and when there is data to be transmitted, the power supply control unit 27a supplies the power stored in the power storage unit 23 to the external transmission unit 25T at a timing of transmitting the data. The power supply control unit 27a stores in advance information indicating a timing of a constant cycle at which the external reception unit 25R transmits data from the external apparatus 40 in an internal storage area, and supplies the power stored in the power storage unit 23 at the constant cycle to the external reception unit 25R.

Note that, a state in which, for example, connection cannot be established due to an unsatisfactory wireless environment, and the external transmission unit 25T cannot transmit data to the external apparatus 40 in the case of a configuration in which the external transmission unit 25T and the external apparatus 40 are wirelessly connected, or a state in which, for example, in order to reduce the processing load of the external apparatus 40, processing for transmitting data by the external apparatus 40 is prioritized over processing for receiving data by the external apparatus 40, and processing in which the external transmission unit 25T transmits data to the external apparatus 40 is suspended while the external reception unit 25R receives data from the external apparatus 40 in the external transmission/reception unit 25a is also assumed. In such a state, the optical reception unit 21R does not output data to the external transmission unit 25T, and writes and stores the data in the data storage unit 26 as downlink data.

In the detection of the state in which the external transmission unit 25T cannot transmit data to the external apparatus 40, for example, the external transmission unit 25T has a flag indicating a connection state with the external apparatus 40 in an internal storage area, and the flag is set to "1" when the data can be transmitted to the external apparatus 40, and the flag is set to "0" when the data cannot be transmitted to the external apparatus 40. Before outputting data to the external transmission unit 25T, the optical reception unit 21R refers to the flag and determines whether to output the data to the external transmission unit 25T or to write and store the data in the data storage unit 26 without outputting the data to the external transmission unit 25T.

Power Supply Processing in Optical Power Supply System of Second Embodiment

Figure 4:
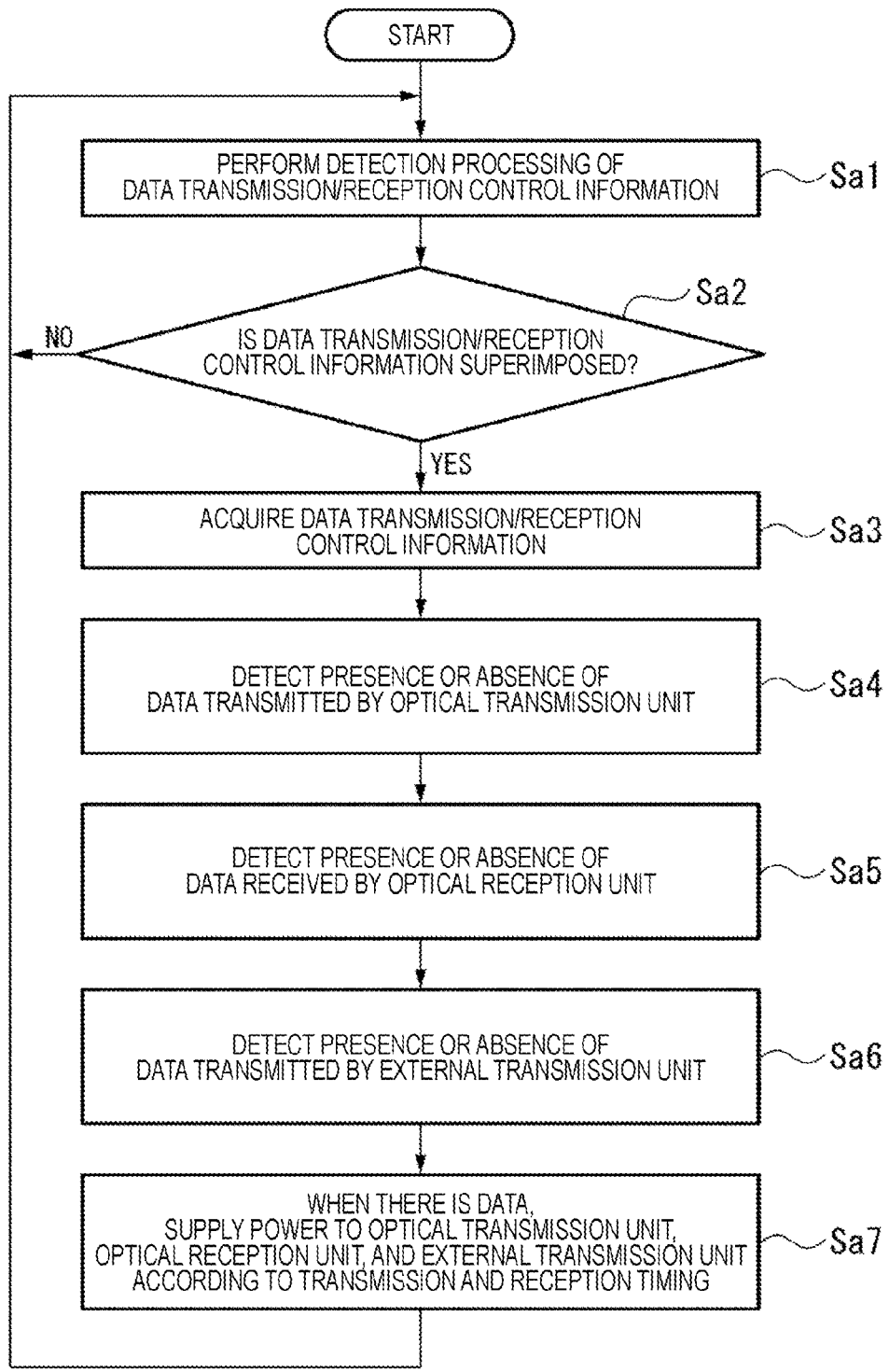
FIG. 4 is a flowchart illustrating a flow of processing by a power receiving side optical communication apparatus according to the second embodiment.
Figure 5:
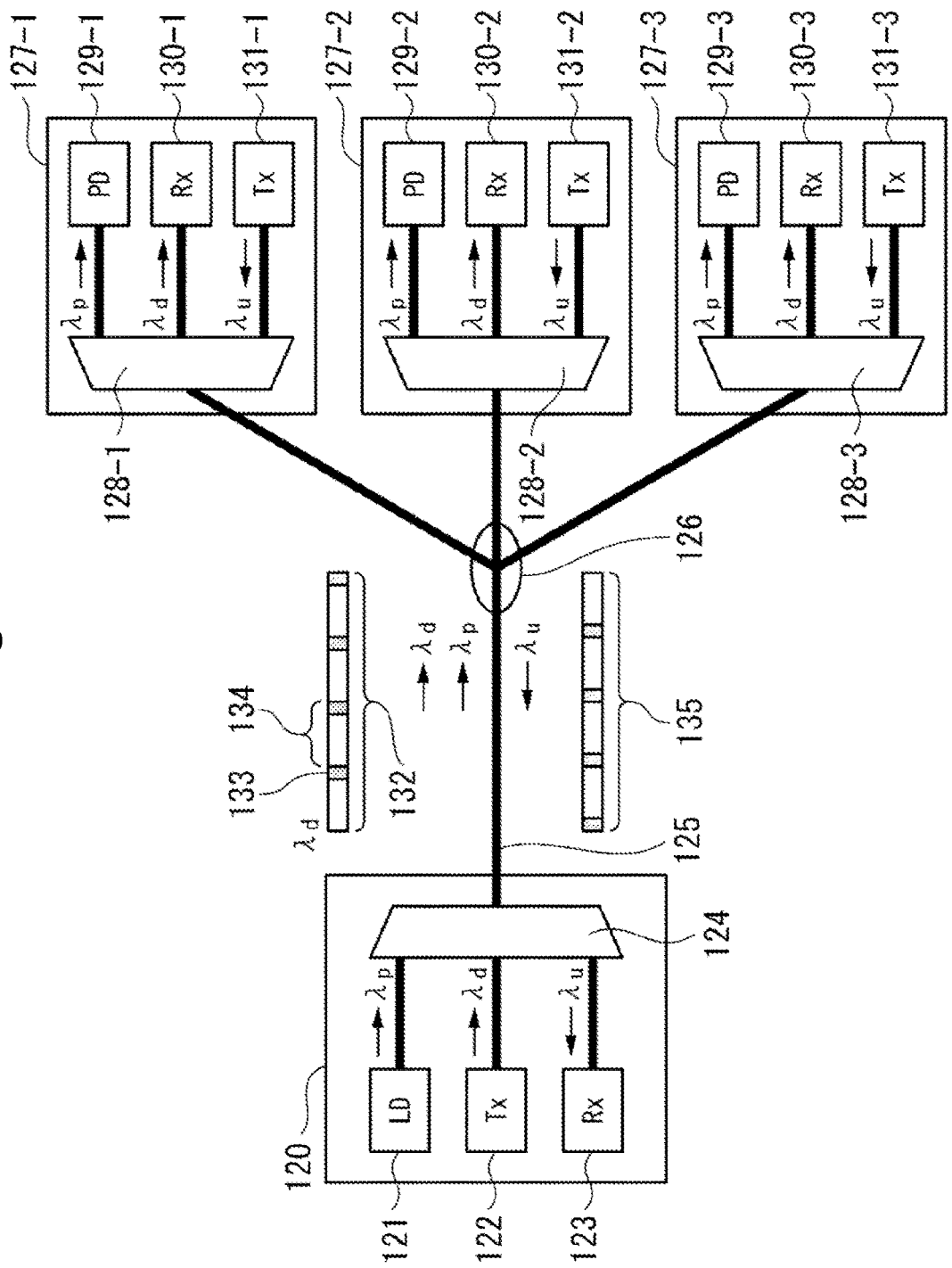
FIG. 5 is a diagram for describing an optical power supply system in the related art.

FIG. 4 is a flowchart illustrating the operation of the power receiving side optical communication apparatus 20a, and power supply processing in the optical power supply system 1a will be described with reference to the flowchart.

Similarly to the first embodiment, in parallel with the processing of the flowchart of FIG. 4, in the optical power supply system 1a, the following processing is repeatedly and continuously performed. The optical power supply unit 12 of the power supply side optical communication apparatus 10 generates an optical signal for power supply, and transmits the generated optical signal for power supply to the power receiving side optical communication apparatus 20a through the optical fiber 31. The data control unit 13 generates data transmission/reception control information at an arbitrarily determined timing, and outputs the generated data transmission/reception control information to the optical power supply unit 12. Upon receiving the data transmission/reception control information from the data control unit 13, the optical power supply unit 12 superimposes the received data transmission/reception control information on an optical signal for power supply and transmits the superimposed optical signal.

Upon receiving the optical signal for power supply through the optical fiber 31, the optical power receiving unit 22 of the power receiving side optical communication apparatus 20a converts the received optical signal for power supply into an electrical signal and outputs the converted electrical signal to the power storage unit 23. The power storage unit 23 performs charging processing on the basis of the electrical signal output from the optical power receiving unit 22, and stores power of the electrical signal.

The external apparatus 40 transmits data measured by a sensor provided inside to the power receiving side optical communication apparatus 20a at a predetermined constant cycle. Therefore, the power supply control unit 27a of the power receiving side optical communication apparatus 20a supplies the power stored in the power storage unit 23 to the external reception unit 25R at the constant cycle. Thereby, the external reception unit 25R of the power receiving side optical communication apparatus 20a can receive data transmitted by the external apparatus 40, and writes and stores the received data in the data storage unit 26 as uplink data.

Hereinafter, the flow of processing will be described with reference to the flowchart of FIG. 4. From step Sa1 to step Sa3, the same processing as from step S1 to step S3 of the first embodiment illustrated in FIG. 2 is performed by the control information detection unit 24 and the power supply control unit 27a of the power receiving side optical communication apparatus 20a.

The power supply control unit 27a detects the presence or absence of data transmitted by the optical transmission unit 21T. Specifically, first, the power supply control unit 27a determines whether or not the data storage unit 26 stores uplink data. The power supply control unit 27a determines whether or not the receivable data amount is not "0" when there is uplink data in the data storage unit 26, and determines that there is data to be transmitted by the optical transmission unit 21T when the receivable data amount is not "0". In a case where there is no uplink data in the data storage unit 26, or in a case where the receivable data amount is "0", which is a state in which the data transmission/reception unit 11 cannot receive data, even when there is uplink data in the data storage unit 26, the power supply control unit 27a determines that there is no data to be transmitted by the optical transmission unit 21T (step Sa4).

The power supply control unit 27a detects the presence or absence of data received by the optical reception unit 21R. Specifically, the power supply control unit 27a determines whether or not the scheduled transmission data amount is not "0", and determines that there is data to be received by the optical reception unit 21R when the scheduled transmission data amount is not "0". When the scheduled transmission data amount is "0", the power supply control unit 27a determines that there is no data to be received by the optical reception unit 21R (step Sa5).

The power supply control unit 27a detects the presence or absence of data transmitted by the external transmission unit 25T. Specifically, the power supply control unit 27a determines whether or not the data storage unit 26 stores downlink data or whether or not the scheduled transmission data amount is not "0", and determines that there is data to be transmitted by the external transmission unit 25T when the data storage unit 26 stores downlink data or when the scheduled transmission data amount is not "0". When the data storage unit 26 does not store the downlink data and the scheduled transmission data amount is "0", the power supply control unit 27a determines that there is no data to be transmitted by the external transmission unit 25T (step Sa6).

When it is detected that there is data to be transmitted by the optical transmission unit 21T, the power supply control unit 27a supplies the power stored in the power storage unit 23 to the optical transmission unit 21T at a receivable timing of the power supply side optical communication apparatus 10 indicated by the transmission/reception timing information read from the data transmission/reception control information. When it is detected that there is data to be received by the optical reception unit 21R, the power supply control unit 27a supplies the power stored in the power storage unit 23 to the optical reception unit 21R at a scheduled transmission timing of the power supply side optical communication apparatus 10 indicated by the transmission/reception timing information read from the data transmission/reception control information. When it is detected that there is data to be transmitted by the external transmission unit 25T, the power supply control unit 27a supplies the power stored in the power storage unit 23 to the external transmission unit 25T at a scheduled transmission timing of the power supply side optical communication apparatus 10 indicated by the transmission/reception timing information read from the data transmission/reception control information (step Sa7). Note that, although the data storage unit 26 stores downlink data, when the scheduled transmission data amount is "0", the power supply control unit 27a may supply the power stored in the power storage unit 23 to the external transmission unit 25T at an arbitrary timing.

Thereby, the optical transmission unit 21T is activated at the receivable timing of the power supply side optical communication apparatus 10 indicated by the transmission/reception timing information, reads the uplink data stored in the data storage unit 26, and transmits the read data to the data transmission/reception unit 11. The optical reception unit 21R and the external transmission unit 25T are activated at the scheduled transmission timing of the power supply side optical communication apparatus 10 indicated by the transmission/reception timing information, and the optical reception unit 21R receives the data transmitted by the data transmission/reception unit 11 and outputs the received data to the external transmission unit 25T. The external transmission unit 25T takes in data output from the optical reception unit 21R, and transmits the taken data to the external apparatus 40. When the data storage unit 26 stores the downlink data, the external transmission unit 25T reads the downlink data from the data storage unit 26 and transmits the read data to the external apparatus 40. When the external transmission unit 25T cannot transmit data to the external apparatus 40, the optical reception unit 21R does not output the data to the external transmission unit 25T but writes and stores the data in the data storage unit 26 as downlink data, and the external transmission unit 25T does not read the downlink data from the data storage unit 26 but keeps the data stored.

In the second embodiment described above, the optical transmission/reception unit 21 includes the optical transmission unit 21T and the optical reception unit 21R. The external transmission/reception unit 25 includes the external transmission unit 25T and an external reception unit 25R. The power supply control unit 27a detects the presence or absence of transmission of data in the optical transmission unit 21T and the external transmission unit 25T and the presence or absence of reception of data in the optical reception unit 21R on the basis of the data transmission/reception control information and the data stored in the data storage unit 26, and supplies power stored in the power storage unit 23 to the optical transmission unit 21T, the optical reception unit 21R, or the external transmission unit 25T according to the detected presence or absence of transmission and reception of the data.

Thereby, the power supply control unit 27a supplies power to each of the optical transmission unit 21T and the external transmission unit 25T only when there is data to be transmitted, and supplies power to the optical reception unit 21R only when there is data to be received. Therefore, power can be prevented from being consumed by unnecessary activation or operation when there is no data to be transmitted or received, and the power stored in the power storage unit 23 can be efficiently used. Furthermore, in the second embodiment, the optical transmission unit 21T and the optical reception unit 21R are separately provided, and the external transmission unit 25T and the external reception unit 25R are separately provided. Therefore, for example, when data is received from the power supply side optical communication apparatus 10, it is only required to supply power necessary for the optical reception unit 21R to be activated and operated to the optical reception unit 21R, and the power to be supplied in this case may be a smaller amount of power than the power required to activate and operate the optical transmission/reception unit 21 of the first embodiment. Therefore, since the power receiving side optical communication apparatus 20a of the second embodiment can supply more appropriate power than the power receiving side optical communication apparatus 20 of the first embodiment, it is possible to suppress power consumption and efficiently use the power stored in the power storage unit 23 as compared with the first embodiment.

In the processing of FIG. 4, the power supply control unit 27a may perform the processing by switching the order of the processing of step Sa4, step Sa5, and step Sa6 in an arbitrary order.

Furthermore, in the second embodiment described above, when the power supply control unit 27a detects that the amount of data stored in the data storage unit 26 has increased and the storage capacity of the data storage unit 26 has reached the limit, the power supply control unit 27a may not supply power based on the data transmission/reception control information, and may not supply power to the optical reception unit 21R and the external reception unit 25R in order not to receive data from the power supply side optical communication apparatus 10 and the external apparatus 40 until the storage capacity of the data storage unit 26 has a margin.

In the first and second embodiments described above, the optical power supply systems 1 and 1a may include the plurality of power receiving side optical communication apparatuses 20 and 20a, and in this case, the power supply side optical communication apparatus 10 and each of the plurality of power receiving side optical communication apparatuses 20 and 20a are connected by a single star type communication network. Since the they are connected by the single star type communication network, the power supply side optical communication apparatus 10 includes the data transmission/reception units 11 and the optical power supply units 12 as many as the number of the plurality of power receiving side optical communication apparatuses 20 and 20a. Each of the plurality of data transmission/reception units 11 is connected one-to-one to the optical transmission/reception unit 21 included in each of the plurality of power receiving side optical communication apparatuses 20 or the optical multiplexer/demultiplexer 28 included in each of the plurality of power receiving side optical communication apparatuses 20a by each of the number of optical fibers 30 corresponding to the number of the plurality of power receiving side optical communication apparatuses 20 and 20a. Each of the plurality of optical power supply units 12 is connected one-to-one to the optical power receiving unit 22 included in each of the plurality of power receiving side optical communication apparatuses 20 and 20a by each of the number of optical fibers 31 corresponding to the number of the plurality of power receiving side optical communication apparatuses 20 and 20a. The reason for connection by the single star type communication network is to make the amount of received light received by the optical power receiving unit 22 of the power receiving side optical communication apparatuses 20 and 20a sufficient. In the case of a passive star type in which one optical fiber is branched into a plurality of optical fibers, the amount of received light received by the optical power receiving unit 22 of the power receiving side optical communication apparatuses 20 and 20a decreases. However, the passive star type may be applied as long as the amount of received light received by the optical power receiving unit 22 of the power receiving side optical communication apparatuses 20 and 20a can be made sufficient even if the passive star type is applied.

In the first and second embodiments described above, instead of the optical fiber 30, two optical fibers for uplink and downlink may be provided. In this case, the data transmission/reception unit 11 does not need to include the optical multiplexer/demultiplexer inside, the optical transmission/reception unit 21 does not need to include the optical multiplexer/demultiplexer inside in the first embodiment, and the optical multiplexer/demultiplexer 28 does not need to be included in the second embodiment. In the first embodiment, a transmission port of the data transmission/reception unit 11 and a reception port of the optical transmission/reception unit 21 are connected to a downlink optical fiber, and a reception port of the data transmission/reception unit 11 and a transmission port of the optical transmission/reception unit 21 are connected to an uplink optical fiber. In the second embodiment, a transmission port of the data transmission/reception unit 11 and the optical reception unit 21R are connected to a downlink optical fiber, and a reception port of the data transmission/reception unit 11 and the optical transmission unit 21T are connected to an uplink optical fiber.

The optical fiber 31 may not be provided, but only the optical fiber 30 may be provided, and transmission and reception of optical signals by wavelength multiplexing may be performed with the wavelength of light emitted from the light source provided inside the data transmission/reception unit 11, the wavelength of light emitted from the light source provided inside the optical transmission/reception unit 21 or the optical transmission/reception unit 21T, and the wavelength of light emitted from the light source provided inside the optical power supply unit 12 as different wavelengths. In this case, in the first embodiment, the data transmission/reception unit 11 and the optical transmission/reception unit 21 do not include an optical multiplexer/demultiplexer inside, but the power supply side optical communication apparatus 10 includes an optical multiplexer/demultiplexer that is connected to the transmission port and the reception port of the data transmission/reception unit 11 and the transmission port of the optical power supply unit 12 on one side, is connected to the optical fiber 30 on the other side, and multiplexes and demultiplexes light of three different wavelengths, and the power receiving side optical communication apparatus 20 includes an optical multiplexer/demultiplexer that is connected to the transmission port and the reception port of the optical transmission/reception unit 21 and the reception port of the optical power receiving unit 22 on one side, is connected to the optical fiber 30 on the other side, and multiplexes and demultiplexes light of three different wavelengths. In the second embodiment, the data transmission/reception unit 11 does not include an optical multiplexer/demultiplexer inside, but the power supply side optical communication apparatus 10 includes an optical multiplexer/demultiplexer that is connected to the transmission port and the reception port of the data transmission/reception unit 11 and the transmission port of the optical power supply unit 12 on one side, is connected to the optical fiber 30 on the other side, and multiplexes and demultiplexes light of three different wavelengths, and the optical multiplexer/demultiplexer 28 of the power receiving side optical communication apparatus 20a is further connected to the optical power receiving unit 22 and multiplexes and demultiplexes light of three different wavelengths.

Although FIGS. 1 and 3 illustrate that the data storage unit 26 is included in the power receiving side optical communication apparatuses 20 and 20a, the optical power supply systems 1 and 1a may include an external data storage device connected to the power receiving side optical communication apparatuses 20 and 20a instead of the data storage unit 26. In the configurations of the first and second embodiments described above, the optical power supply systems 1 and 1a may not include the external apparatus 40.

Furthermore, in the first and second embodiments described above, when the external apparatus 40 transmits data at regular intervals, in the first embodiment, the power supply control unit 27 may supply power to the external transmission/reception unit 25 at the regular intervals, and may temporarily stop the supply of power when data is not received from the external apparatus 40 even after the regular interval has passed. Furthermore, in the second embodiment, the power supply control unit 27a may supply power to the external reception unit 25R at the regular interval, and may temporarily stop the supply of power when data is not received from the external apparatus 40 even after the regular interval has passed.

In addition, in the first and second embodiments described above, the data control unit 13 of the power supply side optical communication apparatus 10 performs processing for taking in data to be transmitted to the power receiving side optical communication apparatus 20 from the outside and outputting the data to the data transmission/reception unit 11, and processing for taking in data of an electrical signal output from the data transmission/reception unit 11 and outputting the data to the outside. On the other hand, the data control unit 13 does not perform the input/output processing of the data with the data transmission/reception unit 11, but the data transmission/reception unit 11 may perform processing for taking in data given from the outside and transmitting the data to the receiving side optical communication apparatuses 20 and 20a and processing for outputting the data received from the power receiving side optical communication apparatuses 20 and 20a to the outside, and the data control unit 13 may monitor the input/output processing of the data of the data transmission/reception unit 11 and detect the scheduled transmission data amount, the receivable data amount, and the transmission/reception timing information.

Furthermore, in the first and second embodiments described above, when generating the data transmission/reception control information, the data control unit 13 may further include external apparatus transmission/reception timing information indicating transmission/reception timing between the arbitrarily determined power receiving side optical communication apparatuses 20 and 20a and the external apparatus 40.

In a case where the external apparatus transmission/reception timing information is included in the data transmission/reception control information, in the first embodiment, when the presence of the data transmitted by the external transmission/reception unit 25 is detected in the processing of step S7, the power supply control unit 27 supplies the power stored in the power storage unit 23 to the external transmission/reception unit 25 at the transmission timing to the external apparatus 40 indicated by the external apparatus transmission/reception timing information included in the data transmission/reception control information, instead of the scheduled transmission timing of the power supply side optical communication apparatus 10 indicated by the transmission/reception timing information. In addition, in the processing of step S7, the power supply control unit 27 supplies the power stored in the power storage unit 23 to the external transmission/reception unit 25 at the reception timing of the data transmitted by the external apparatus 40 indicated by the external apparatus transmission/reception timing information included in the data transmission/reception control information. Furthermore, before the external apparatus 40 transmits data, information indicating the amount of data scheduled to be transmitted may be transmitted to the power receiving side communication apparatus 20. In this case, the power supply control unit 27 may supply power to the external transmission/reception unit 25 on the basis of the amount of data scheduled to be transmitted by the external apparatus 40 received from the external apparatus 40.

In addition, in a case where the external apparatus transmission/reception timing information is included in the data transmission/reception control information, in the second embodiment, when the presence of the data transmitted by the external transmission unit 25T is detected in the processing of step Sa7, the power supply control unit 27a supplies the power stored in the power storage unit 23 to the external transmission unit 25T at the transmission timing to the external apparatus 40 indicated by the external apparatus transmission/reception timing information included in the data transmission/reception control information, instead of the scheduled transmission timing of the power supply side optical communication apparatus 10 indicated by the transmission/reception timing information. In addition, in the processing of step Sa7, the power supply control unit 27a supplies the power stored in the power storage unit 23 to the external reception unit 25R at the reception timing of the data transmitted by the external apparatus 40 indicated by the external apparatus transmission/reception timing information included in the data transmission/reception control information. Furthermore, before the external apparatus 40 transmits data, information indicating the amount of data scheduled to be transmitted may be transmitted to the power receiving side communication apparatus 20a. In this case, the power supply control unit 27a may supply power to the external reception unit 25R on the basis of the amount of data scheduled to be transmitted by the external apparatus 40 received from the external apparatus 40.

In the first and second embodiments described above, the power supply control units 27 and 27a monitor the amount of power stored in the power storage unit 23. For example, when the remaining amount of power is equal to or less than a predetermined threshold value, in the first embodiment, which of the optical transmission/reception unit 21 and the external transmission/reception unit 25 is prioritized may be determined in advance, and the power supply control unit 27 may supply power in descending order of priority. In addition, in the second embodiment, which of the optical transmission unit 21T, the optical reception unit 21R, the external transmission unit 25T, and the external reception unit 25R is prioritized may be determined in advance, and the power supply control unit 27a may supply power in descending order of priority.

The control information detection unit 24, the power supply control units 27 and 27a, and the data storage unit 26 of the power receiving side optical communication apparatuses 20 and 20a in the above-described embodiments may be realized by a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disc, a read-only memory (ROM), or a compact disc read-only memory (CD-ROM), or a storage device such as a hard disk built in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as a field programmable gate array (FPGA).

Although the embodiments of the present invention have been described in detail with reference to the drawings so far, specific configurations are not limited to these embodiments, and include designs and the like without departing from the spirit of the present invention.

INDUSTRIAL APPLICABILITY

The present invention can be applied to an optical communication system that performs optical power supply.

REFERENCE SIGNS LIST

1 Optical power supply system
10 Power supply side optical communication apparatus
11 Data transmission/reception unit
12 Optical power supply unit
13 Data control unit
20 Power receiving side optical communication apparatus
21 Optical transmission/reception unit
22 Optical power receiving unit
23 Power storage unit
24 Control information detection unit
25 External transmission/reception unit
26 Data storage unit
27 Power supply control unit
30, 31 Optical fiber
40 External apparatus

The invention claimed is:

1. An optical power supply system comprising:
a power supply side optical communication apparatus; and
a power receiving side optical communication apparatus,
wherein the power supply side optical communication apparatus comprises:
　an optical power supply unit configured to transmit an optical signal for power supply;
　a data transmission/reception unit configured to transmit and receive an optical signal of data; and
　a data control unit configured to superimpose data transmission/reception control information related to transmission/reception of data transmitted/received by the data transmission/reception unit on the optical signal for power supply, and
wherein the power receiving side optical communication apparatus comprises:
　a power storage unit configured to store power obtained from the optical signal for power supply transmitted by the optical power supply unit;
　a control information detection unit configured to detect the data transmission/reception control information superimposed on the optical signal for power supply;
　an optical transmission/reception unit configured to transmit and receive the optical signal of the data to and from the data transmission/reception unit;
　an external transmission/reception unit configured to transmit and receive the data to and from an external apparatus;
　a data storage unit configured to store data that has not been transmitted to the power supply side optical communication apparatus or the external apparatus; and
　a power supply control unit configured to detect presence or absence of transmission and reception of the data in the optical transmission/reception unit and the external transmission/reception unit on a basis of the data transmission/reception control information detected by the control information detection unit and the data stored in the data storage unit, and supply the power stored in the power storage unit to the optical transmission/reception unit or the external transmission/reception unit according to the detected presence or absence of transmission and reception of the data.

2. The optical power supply system according to claim 1, wherein the optical transmission/reception unit comprises an optical transmission unit and an optical reception unit,
the external transmission/reception unit comprises an external transmission unit and an external reception unit, and
the power supply control unit is configured to:
　detect presence or absence of transmission of the data in the optical transmission unit and the external transmission unit and presence or absence of reception of the data in the optical reception unit on the basis of the data transmission/reception control information and the data stored in the data storage unit, and
　supply the power stored in the power storage unit to the optical transmission unit, the optical reception unit, the external transmission unit, or the external reception unit according to the detected presence or absence of transmission and reception of the data.

3. The optical power supply system according to claim 1, wherein the data transmission/reception control information comprises a scheduled transmission data amount and a receivable data amount,
the scheduled transmission data amount indicating a data amount of data scheduled to be transmitted by the power supply side optical communication apparatus to the power receiving side optical communication apparatus,
the receivable data amount indicating a data amount of data that is able to be received by the power supply side optical communication apparatus from the power receiving side optical communication apparatus, and
the power supply control unit is configured to:
　detect presence or absence of data transmitted by the optical transmission/reception unit on a basis of uplink data transmitted from the power receiving side optical communication apparatus to the power supply side optical communication apparatus stored in the data storage unit and the receivable data amount,
　detect presence or absence of data received by the optical transmission/reception unit on a basis of the scheduled transmission data amount,
　detect presence or absence of data transmitted by the external transmission/reception unit on a basis of downlink data transmitted from the power receiving side optical communication apparatus to the external apparatus stored in the data storage unit and the scheduled transmission data amount, and
　detect presence or absence of data received by the external transmission/reception unit on a basis of the amount of data scheduled to be transmitted by the external apparatus transmitted from the external apparatus.

4. The optical power supply system according to claim 1, wherein the data transmission/reception control information comprises transmission/reception timing information indicating a timing at which the power supply side optical communication apparatus transmits and receives data, and when there is data to be transmitted, at a receivable timing of the power supply side optical communication apparatus indicated by the transmission/reception timing information, the power supply control unit is configured to supply power to the optical transmission/reception unit or supply power to an optical transmission unit when the optical transmission/reception unit includes the optical transmission unit and an optical reception unit, and when there is data to be received by the optical transmission/reception unit, at a scheduled transmission timing of the power supply side optical communication apparatus indicated by the transmission/reception timing information, the power supply control unit is configured to supply power to the optical transmission/reception unit or supply power to an optical reception unit when the optical transmission/reception unit includes an optical transmission unit and the optical reception unit.

5. The optical power supply system according to claim 4, wherein, when absence of the data has been detected at a time of detecting presence or absence of the data, the power supply control unit is configured to not supply power to the optical transmission/reception unit or the external transmission/reception unit that has detected absence of the data, and when the optical transmission/reception unit includes an optical transmission unit and an optical reception unit and the external transmission/reception unit includes an external transmission unit and an external reception unit, the power supply control unit is configured to not supply power to the optical transmission unit, the optical reception unit, the external transmission unit, or the external reception unit that has detected absence of the data.

6. The optical power supply system according to claim 1, further comprising a data storage device that is provided outside the power receiving side optical communication apparatus and is connected to the power receiving side optical communication apparatus, instead of the data storage unit.

7. A power receiving side optical communication apparatus that is connected to a power supply side optical communication apparatus including an optical power supply unit configured to transmit an optical signal for power supply, a data transmission/reception unit configured to transmit and receive an optical signal of data, and a data control unit configured to superimpose data transmission/reception control information related to transmission/reception of data transmitted/received by the data transmission/reception unit on the optical signal for power supply, the power receiving side optical communication apparatus comprising:

a power storage unit configured to store power obtained from the optical signal for power supply;
a control information detection unit configured to detect the data transmission/reception control information superimposed on the optical signal for power supply;
an optical transmission/reception unit configured to transmit and receive the optical signal of the data to and from the data transmission/reception unit;
an external transmission/reception unit configured to transmit and receive the data to and from an external apparatus;
a data storage unit configured to store data that has not been transmitted to the power supply side optical communication apparatus or the external apparatus; and
a power supply control unit configured to detect presence or absence of transmission and reception of the data in the optical transmission/reception unit and the external transmission/reception unit on a basis of the data transmission/reception control information detected by the control information detection unit and the data stored in the data storage unit, and supply the power stored in the power storage unit to the optical transmission/reception unit or the external transmission/reception unit according to the detected presence or absence of transmission and reception of the data.

8. A power supply method performed in an optical power supply system including a power supply side optical communication apparatus and a power receiving side optical communication apparatus, the power supply method comprising:

supplying, by the power supply side optical communication apparatus, power to the power receiving side optical communication apparatus using an optical signal for power supply;
storing, by a power storage unit of the power receiving side optical communication apparatus, the supplied power;
transmitting and receiving, by a data transmission/reception unit of the power supply side optical communication apparatus and an optical transmission/reception unit of the power receiving side optical communication apparatus, optical signals of data;
transmitting and receiving, by an external transmission/reception unit of the power receiving side optical communication apparatus and an external apparatus, the data;
recording, in a data storage unit of the power receiving side optical communication apparatus, data that has not been transmitted to the power supply side optical communication apparatus or the external apparatus;
superimposing, by a data control unit of the power supply side optical communication apparatus, data transmission/reception control information related to transmission/reception of data transmitted/received by the data transmission/reception unit on the optical signal for power supply;
detecting, by a control information detection unit of the power receiving side optical communication apparatus, the data transmission/reception control information superimposed on the optical signal for power supply; and
detecting, by a power supply control unit of the power receiving side optical communication apparatus, presence or absence of transmission and reception of the data in the optical transmission/reception unit and the external transmission/reception unit on a basis of the data transmission/reception control information detected by the control information detection unit and the data stored in the data storage unit, and supplying the power stored in the power storage unit to the optical transmission/reception unit or the external transmission/reception unit according to the detected presence or absence of transmission and reception of the data.

* * * * *